July 14, 1931.    G. B. STARIE    1,814,865
SYSTEM OF MOTOR CONTROL
Filed Sept. 6, 1929
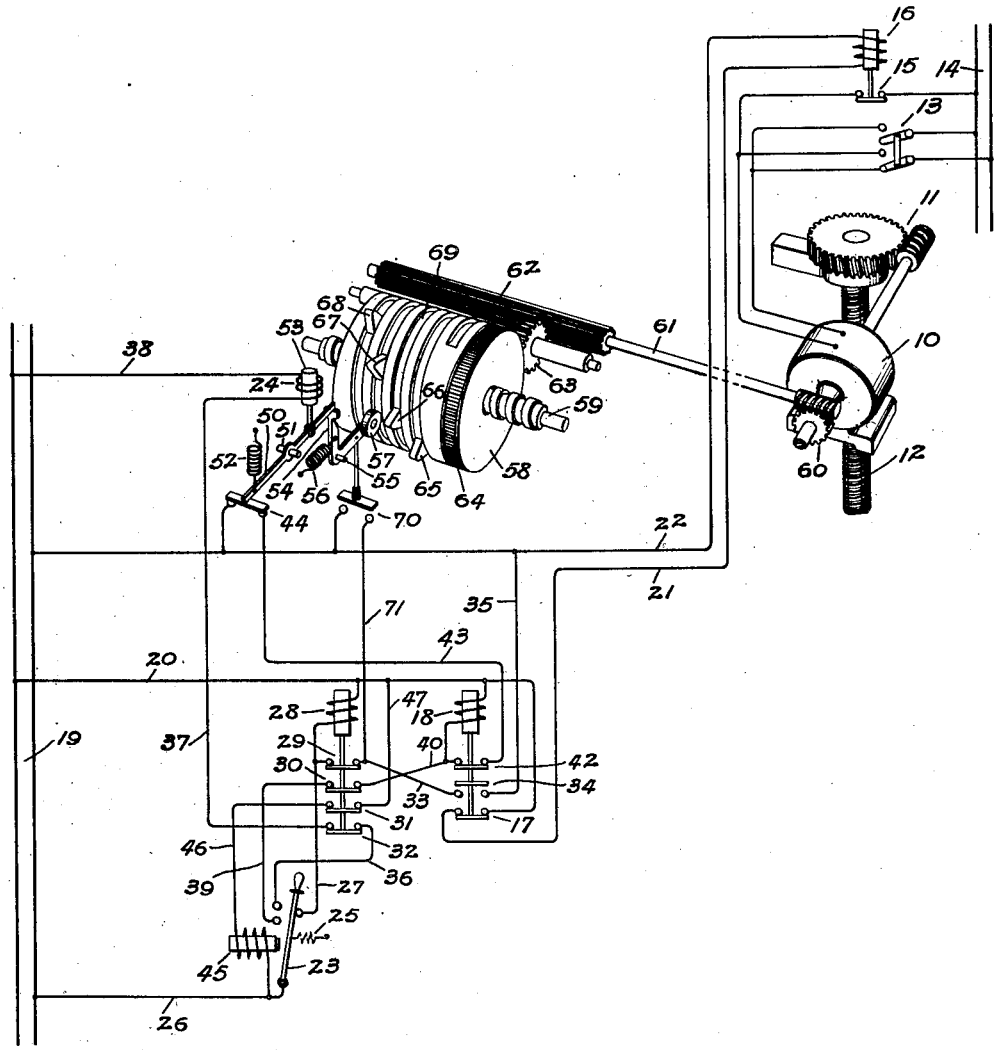
Inventor:
George B. Starie,
by Charles V. Tullar
His Attorney.

Patented July 14, 1931

1,814,865

UNITED STATES PATENT OFFICE

GEORGE B. STARIE, OF SCHENECTADY, NEW YORK, ASSIGNOR TO GENERAL ELECTRIC COMPANY, A CORPORATION OF NEW YORK

SYSTEM OF MOTOR CONTROL

Application filed September 6, 1929. Serial No. 390,807.

My invention relates to systems of motor control and has for its object the provision of a simple and reliable system for the intermittent control of electric motors.

More particularly my invention relates to systems of control for electric motors which are intermittently or periodically utilized to carry out a predetermined series of operations. Although it obviously has other uses my invention is especially applicable to the control of screwdown drive motors for adjusting the relation of the rolls of a rolling mill for metals and the like.

In carrying out my invention in one form I provide manually operated switching means for starting the motor and means driven by the motor for stopping the motor after it has operated to make one of a predetermined series of roll adjustments.

For more complete understanding of my invention reference should be had to the accompanying drawing the single figure of which is a diagrammatic illustration of a system of motor control embodying my invention.

Referring to the drawing I have shown my invention in one form as applied to the control of an electric motor 10 which is operatively connected through worm gearing 11 to an adjusted screw 12 by means of which the rolls of the rolling mill, not shown, are adjusted with relation to each other. Ordinarily the screw 12 is connected to raise or lower the upper one of a pair of rolls. As the length of the metal is passed successively through the rolls, the screw is adjusted to screw down the upper roll between the passes and consequently control systems for the screw motor are often referred to as "screwdown controls". In the present system a manually operated switch 13 is provided whereby the motor, shown as a direct current motor, may be connected to a suitable direct current supply source 14 by throwing the switch 13 to its upper position so as to rotate in a direction to raise the roll. With the switch 13 in its lower position as shown one terminal only of the motor is connected through the switch to the supply source, the connections for the other terminal being controlled by means of an electromagnetic switch 15 operated by the coil 16. The coil 16 may be energized to close the switch 15 by means of an auxiliary control switch or relay 17 operated by the coil 18. This circuit for coil 16 leads from one side of a supply source 19, which may be the same as the supply source 14, through a conductor 20, switch 17, conductor 21, coil 16, conductor 22 back to the opposite side of the supply source.

In the form of my invention shown the operating coil 18 is in turn energized to start the motor by means of a manually operated switch arm 23 which also controls the energization of a reset magnet coil 24. The switch arm 23 is normally biased to its right hand position, as shown, by means of a spring 25 and in this position a circuit is closed from the supply source, through conductor 26, the switch arm, conductor 27 and an operating coil 28 to the conductor 20 whereby the coil 28 is energized and picks up its armature to close a plurality of interlock or relay switches 29, 30, 31 and 32. The closing of switch 29 establishes a holding circuit for the coil 28, which circuit leads through the switch, the conductor 33, a normally closed interlock switch 34 operated by the coil 18, and a conductor 35 which leads to the conductor 22. In view of this holding circuit the switch arm 23 may, therefore, be moved to the right to its second position without deenergizing the coil 28. When this is done two circuits are closed, one leading from the switch arm through the conductor 36, the relay switch 32, the conductor 37, the reset magnet 24 and conductor 38 back to the opposite side of the supply source. The second circuit is from the switch arm to the conductor 39, the relay switch 30, conductor 40, the operating coil 18 to the conductor 20, whereby the coil 18 is energized and picks up its armature closing the switch 17 to start the motor.

At the same time the switch 34 is opened thus opening the holding circuit for the coil 28 and allowing the switches 29 to 32 to open. Also a relay switch 42 is closed by the coil 18 whereby a holding circuit is established for the coil 18 through this switch, a conductor 43, a relay control switch 44, which is assumed to be closed as shown in the drawing, and conductor 22 back to the supply source. The motor is now operating to screw down the roll.

A holding magnet 45 is provided to hold the switch arm momentarily 23 in its left-hand position after it has once been moved to that position. This magnet is energized when the switch arm is in its right-hand position as shown, through the relay switch 31, the circuit leading from the conductor 26, magnet 45, conductor 46, switch 31 and conductor 47 to the conductor 20. When the switch arm is thrown to the left, therefore, it will be held momentarily in that position by the magnet 45 until the circuit of the magnet has been opened by the opening of the switch 31 which is effected as previously described by the opening of the switch 34. It will be understood that an appreciable time interval is introduced between the opening of the switch 34 and the deenergization of the magnet 45 by means of the inductance and the residual magnetism of the operating coil 28 and the magnet 45. Consequently the switches 17 and 42 are closed, whereby a holding circuit is established for the coil 18, before the magnet 45 releases the switch arm, which initially established the circuit for the coil 18. When the switch arm 23 returns to its right-hand position, as shown, in accordance with its bias the coil 28 is again energized whereby the switches 29 and 32 are closed and the magnet coil 45 is again energized. The magnet coil, however, cannot attract the switch arm to its left-hand position.

For purposes of automatic control the movable member of the switch 44 is arranged on one end of a lever arm 50 provided with a substantially central pivot 51. A spring 52 biases the switch 44 to the open position, and the switch is closed by means of the reset coil 24 which is provided with an armature 53 pivotally connected to the lever 50 on the opposite side of its pivot from the switch. In other words, the reset coil moves that end of the lever upward to close the switch, and when this takes place the upper end of a pivoted latch 54 slips under the end of the lever so as to hold the switch 44 in closed position. As shown, the latch 54 is provided with a pivot 55 and is biased to the latching position by a spring 56. A substantially right angle extension is provided on the latch 54 adjacent its pivot point, forming in effect a bellcrank, the outer end of the extension being provided with a roller 57.

Arranged in cooperative relation with the roller 57 is a drum 58 having a threaded central bore and mounted on a screw 59 which is secured against rotation in such position that the drum, when rotated so as to travel axially along the screw 59, has its outer face adjacent the roller 57. The drum is rotated by the motor 10 so as to be responsive to the screwdown motion given the roll, a driving connection from the motor shaft being provided by a suitable worm gear 60, shaft 61, an elongated pinion 62, an intermediate pinion 63 and a pinion 64 on one end of the drum. It will be understood that the pinion 63 moves axially with the drum and slides along the pinion 62 so that the driving connection with the motor is maintained regardless of the position of the drum.

This drum 58 and cooperating parts provide means for operating the latch 54 to open switch 44 and thus stop the motor after a predetermined adjustment of the roll has been made. In order to effect the operation of the latch a plurality of circumferentially and axially spaced projections are provided on the surface of the drum which are arranged to successively engage the roller 57 as the drum is rotated and thus depress the roller to release the switch. As shown, four projections 65, 66, 67 and 68, constituting step by step means, are provided on the drum. Preferably these projections are arranged in a screw thread 69 on the drum having the same pitch as the screw 59. The projections are suitably adjustable in this groove so that their circumferential spacing may be varied. It will be understood that the roller 57 is so arranged that it is just opposite the groove in position to be successively engaged by the projections.

In the operation of the system, assuming that the motor 10 is in operation in a direction to screw down the roll, the drum will be rotated in a counterclockwise direction as viewed from its right-hand end as seen in the drawing. The next projection to engage the roller is projection 67 and in this way the switch 44 is opened thus opening the circuit of the coil 18 whereby the switches 17, 34 and 42 are moved to their opposite positions, the switch 17 opening to effect the opening of the motor circuit, the switch 34 closing to close a holding circuit for the coil 28, and the switch 42 opening. Ordinarily, the inertia of the motor is such that the projection is carried downward completely past the roller so as to free the latch 54 which, however, at this time rests against the end of the lever 50 which is held in its open circuit position by the spring 52.

When the next screwdown adjustment is to be given the roll the operator moves the switch arm 23 to its left-hand position where it is momentarily held by the magnet 45. As previously described, this energizes the reset magnet 24 and closes the switches 17 and 42 whereby the motor is started. The switch arm 23 is thereafter released and returns to the right-hand position in accordance with its bias whereby the coil 28 is energized ready for the next cycle.

As previously noted, the projection is ordinarily carried past the roller 57 so that the latch is free to respond when the reset magnet 24 is energized. To take care of the condition arising from a failure of the projection to move by and release the latch, i. e. where the latch is held depressed and hence is ineffective to lock the switch 44 in closed position, a switch 70 is provided having its movable contact member actuated by the latch. When the roller 57 is depressed, this switch is closed and establishes a holding circuit for the coil 28, this circuit leading from the conductor 20 through the coil 28, switch 29, conductor 71, and switch 70 to the conductor 22. The circuit for the coil 28, therefore, is not broken when the switch 34 is opened, and consequently the switch 30 is maintained closed, temporarily of course, thus maintaining a circuit for the coil 18. Switches 31 and 32 are also temporarily maintained closed so that magnets 24 and 45 are energized, the latter holding the switch arm 23 in its left-hand position. The motor now starts up and as soon as the projection in the drum has released the roller 57 the switch 70 is opened and normal conditions are restored.

It will thus be observed that the motor 10 is controlled to screw down the roll in a series of predetermined steps, the only function required of the operator being to move the switch arm 23 to its left-hand position after which it may be immediately released, and in fact it should be released before the latch is operated in order to provide for the next cycle of operations. When it is desired to raise the roll, for example to accommodate a new piece of metal, the switch 13 is thrown to its upper position which energizes the motor 10 for reverse direction of operation. When the roll has been raised the desired amount the switch 13 is thrown to the lower position for the automatic control previously described.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States is:

1. A system of control for electric motors comprising an electromagnetic control switch for the motor circuit, a relay switch for controlling the operating circuit of said control switch, a holding device for maintaining said relay switch in closed circuit position, means driven by the motor for operating said holding device to open said relay switch, means movable to a predetermined position to close said control and relay switches, said means being biased to another position, and means operated by said control switch for closing a control circuit therefor through said relay switch.

2. A system of control for electric motors comprising an electromagnetic control switch for the motor circuit, a relay switch for controlling the operating circuit of said control switch, a latching device for maintaining said relay switch in closed circuit position, means driven by the motor for operating said latching device to open said relay switch, a manually operated device movable to a predetermined position to effect the closing of said switches, means for holding said manually operated device in said predetermined position, and means operated by the closing of said control switch for releasing said holding means.

3. A system of control for electric motors comprising a control switch for the motor circuit, an operating coil for said control switch, auxiliary switching means biased to open circuit position for controlling the circuit of said coil including a holding device for maintaining said auxiliary switching means in closed circuit position, means actuated by the motor for releasing said holding device, closing means for said auxiliary switching means and said control switch including a manually operated device, movable to a predetermined position to close said switches, means for holding said device in said predetermined position, and means controlled by said control switch for releasing said holding means.

4. A system of motor control for electric motors comprising a normally open control switch for the motor circuit, a magnet coil for actuating said switch to closed position to start the motor, a relay switch, means for biasing said relay switch to the open position, means for holding said switch in closed position, means operated by the motor for releasing said holding means to allow said relay switch to open, a magnet coil for closing said relay switch, switching means movable to a predetermined position to close the circuits of said magnet coils, and means operable by said first magnet coil for completing a circuit therefor through said relay switch.

5. A system of motor control for electric motors comprising a normally open control switch for the motor circuit, a magnet coil for actuating said switch to closed position to start the motor, a relay switch in the circuit of said coil, means for biasing said switch to the open position, means for holding said switch in closed position, means operated by the motor for releasing said holding means to allow said relay switch to open, a magnet coil for closing said relay switch, a manually operated switch movable to a predetermined position to close the circuits of said magnet coils, means for holding said manually operated switch in said position, and means responsive to the closing of said control switch for releasing said holding means.

6. A system of control for electric motors comprising an electromagnetic control switch for the motor circuit, a relay switch in the operating circuit of said control switch, means for biasing said relay switch to open position, latching means for holding said relay switch in closed position, means driven by said motor for tripping said latching means to open the operating circuit of said control switch, a magnet for closing said relay switch against its bias, and a manually operated switching device for energizing said magnet and for initially closing the operating circuit of said control switch, after which said circuit is maintained closed by said relay switch.

7. A system of motor control comprising a control switch for the motor circuit, an operating coil for said control switch, means for effecting the opening of said circuit including a latching device normally maintaining said circuit closed, a reset magnet for said latching device, a manual switch for energizing said reset magnet and said control switch coil, means for biasing said manual switch to one position, a magnet for holding said manual switch in another position, means operated by said control switch for deenergizing said holding magnet when the motor circuit is closed, said means including an electromagnetic holding switch in the circuit of said holding magnet, and connections for reclosing said holding switch when said manually operated switch is released by said holding magnet.

8. A system of control comprising in combination with an electric motor, of an electromagnetic control switch therefor, a second switch in series with said control switch, means for biasing said second switch to open position, latching means for holding said switch in closed position, step-by-step means driven by said motor for tripping said latching means to open said second switch, a resetting magnet coil for said latching means, a pair of normally open relay switches, an operating coil therefor, a manually operated switch biased to one position to close a circuit for said coil, connections whereby one of said relay switches establishes a holding circuit for said coil, a normally closed switch in said holding circuit, means associated with said manually operated switch for energizing said resetting coil and for operating said control switch to start the motor when said manually operated switch is moved to a second position against its bias, means operated by said control switch for opening said normally closed switch to deenergize said relay coil, a magnet coil for holding said manually operated switch in said second position, and connections for said magnet coil including the second of said relay switches.

9. In combination in a system of motor control, a control switch for the motor, an operating coil therefor, a manual switch biased to one position and movable to a second position to close a circuit for said coil, a magnet coil for holding said manual switch in said second position, a holding switch responsive to movement of said control switch for opening the circuit of said magnet coil when said control switch closes whereby said manual switch is released and is returned to its first position in accordance with its bias, and connection established by said manual switch in said first position for closing said holding switch to reenergize said magnet coil.

10. In combination in a system of motor control, an electromagnetic control switch for the motor, an electromagnetic holding switch, a manual switch biased to one position to close the operating circuit of said holding switch and movable to a second position against its bias to close the operating circuit of said control switch, a magnet for holding the manual switch in said second position, a circuit for said magnet including said holding switch, and an auxiliary switch for controlling the operating circuit of said holding switch independently of said manual switch, said auxiliary switch being moved to closed position by the opening of said control switch, whereby movement of said manual switch to said second position closes said control switch to start the motor and opens said holding switch to deenergize said holding magnet thereby releasing said manual switch.

In witness whereof, I have hereunto set my hand this 5th day of September, 1929.

GEORGE B. STARIE.